United States Patent
Ogai et al.

(10) Patent No.: US 8,326,280 B2
(45) Date of Patent: Dec. 4, 2012

(54) CALL ADMISSION CONTROL METHOD AND RADIO CONTROLLER APPARATUS

(75) Inventors: Masahiko Ogai, Yokohama (JP); Yasuhiro Kawabe, Yokosuka (JP); Masafumi Masuda, Yokosuka (JP); Yasuyuki Watanabe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 316 days.

(21) Appl. No.: 12/666,724

(22) PCT Filed: Jun. 27, 2008

(86) PCT No.: PCT/JP2008/061757
§ 371 (c)(1),
(2), (4) Date: Mar. 26, 2010

(87) PCT Pub. No.: WO2009/001936
PCT Pub. Date: Dec. 31, 2008

(65) Prior Publication Data
US 2010/0210257 A1    Aug. 19, 2010

(30) Foreign Application Priority Data

Jun. 27, 2007 (JP) .................................. 2007-169323

(51) Int. Cl.
*H04W 40/00* (2009.01)
(52) U.S. Cl. .................................................... 455/422.1
(58) Field of Classification Search ................ 455/422.1, 455/436, 435.1, 456.1–456.6; 370/315, 331, 370/338, 328, 329, 330
See application file for complete search history.

(56) References Cited

U.S. PATENT DOCUMENTS

| | | | | |
|---|---|---|---|---|
| 6,272,334 | B1 * | 8/2001 | Rao ................................ | 455/418 |
| 7,689,238 | B2 * | 3/2010 | Biswas et al. .................. | 455/518 |
| 7,782,890 | B2 * | 8/2010 | Herberger et al. ............ | 370/432 |
| 7,860,039 | B2 * | 12/2010 | Lee et al. ....................... | 370/312 |

(Continued)

FOREIGN PATENT DOCUMENTS

JP    7 303280    11/1995

(Continued)

OTHER PUBLICATIONS

3GPP TS 21.101 V6.7.0, "3$^{rd}$ Generation Partnership Project; Technical Specification Group Services and System Aspects; Technical Specifications and Technical Reports for a UTRAN-based 3GPP system (Release 6)", pp. 1-29, (Jun. 2006).

(Continued)

*Primary Examiner* — Melody Mehrpour
(74) *Attorney, Agent, or Firm* — Oblon, Spivak, McClelland, Maier & Neustadt, L.L.P.

(57) ABSTRACT

A call admission control method according to the present invention includes the steps of: receiving, at a first radio controller apparatus (01), a call setting instruction for a first mobile station (01) located in a first cell (01), from a core network; and setting an access link between the first radio controller apparatus (01) and a first radio base station (01) serving the first cell (01), and setting a first radio link between the first radio base station (01) and the first mobile station (01) in the first cell (01), when a group ID of the first mobile station (01) included in the call setting instruction is determined to be managed by the first radio controller apparatus (01) as a group ID of a mobile station allowed to perform communications in the first cell (01).

9 Claims, 16 Drawing Sheets

U.S. PATENT DOCUMENTS

| | | | | |
|---|---|---|---|---|
| 2004/0092288 A1* | 5/2004 | Moon et al. | .................... | 455/560 |
| 2005/0186970 A1* | 8/2005 | Yates et al. | ................. | 455/456.5 |
| 2005/0249187 A1* | 11/2005 | Cho et al. | ...................... | 370/349 |
| 2007/0249347 A1* | 10/2007 | Saifullah et al. | ............... | 455/436 |
| 2008/0043702 A1* | 2/2008 | Moon et al. | .................... | 370/342 |
| 2008/0153518 A1* | 6/2008 | Herberger et al. | ............ | 455/466 |
| 2008/0188221 A1* | 8/2008 | Hashimoto et al. | ......... | 455/435.1 |
| 2010/0103890 A1* | 4/2010 | Ishii et al. | ..................... | 370/329 |

FOREIGN PATENT DOCUMENTS

| | | |
|---|---|---|
| JP | 2001 103551 | 4/2001 |
| JP | 2005 109570 | 4/2005 |
| JP | 2006 197511 | 7/2006 |

OTHER PUBLICATIONS

3GPP TS 25.413 V6.14.0, "$3^{rd}$ Generation Partnership Project; Technical Specification Group Radio Access Network; UTRAN Iu interface RANAP signalling (Release 6)" pp. 1-336, (Jun. 2007).

* cited by examiner

FIG. 9

| CELL NUMBER | COMMUNICATION ALLOWED GROUP ID LIST | | | | |
|---|---|---|---|---|---|
| CELL 01 | A | C | D | E | ... |
| CELL 02 | A | D | E | | |
| ... | | | | | |

FIG. 10

| CELL NUMBER | COMMUNICATION NOT-ALLOWED GROUP ID LIST | | | | |
|---|---|---|---|---|---|
| CELL 03 | E | F | G | H | ... |
| CELL 06 | F | G | H | | |

FIG. 11

| CELL NUMBER | COMMUNICATION NOT-ALLOWED GROUP ID LIST | | | | |
|---|---|---|---|---|---|
| CELL 03 | E | F | G | H | ... |
| CELL 06 | F | G | H | | |
| CELL 05 | C | | | | |

FIG. 13

| CELL NUMBER | COMMUNICATION ALLOWED GROUP ID LIST | | | | |
|---|---|---|---|---|---|
| CELL 03 | A | C | D | E | ... |
| CELL 04 | A | D | E | | |
| CELL 05 | A | | | | |
| CELL 06 | A | B | E | | |
| ... | | | | | |

CALL ADMISSION CONTROL METHOD AND RADIO CONTROLLER APPARATUS

TECHNICAL FIELD

The present invention relates to a call admission control method for a mobile station located in a particular cell, and also to a radio controller apparatus.

BACKGROUND ART

In recent years, a mobile communication system called "W-CDMA (Wideband-Code Division Multiple Access)" based on a CDMA (Code Division Multiple Access) technology has been proposed by the 3GPP (3rd Generation Partnership Project) and then specified in Non-Patent Document 1.

FIG. 1 shows a typical configuration example of the W-CDMA mobile communication system. As shown in FIG. 1, the mobile communication system includes: radio base stations (NodeBs) each provided with a radio communication function to perform radio communications with mobile stations (UEs: User Equipments) each provided with a radio communication function; radio controller apparatuses (RNCs: Radio Network Controllers) each connected to a corresponding one or more of the radio base stations and performing a radio control operation; and a switching center (MMS: Multimedia Messaging Service) connected to the radio controller apparatuses and performing a switching operation.

As shown in FIG. 1, communications between a mobile station 01 and a mobile station 02 are achieved in the mobile communication system by the aforementioned radio base stations, radio controller apparatuses and switching center.

Here, a network including a radio base station and a radio controller apparatus is called a "Radio Access Network (RAN)", and a network including a switching center is called a "Core Network (CN)".

Note that, although the core network includes an apparatus other than the switching center, a description of the apparatus is omitted in this description since the description thereof is not necessary for explaining the present invention.

In the mobile communication system shown in FIG. 1, a radio base station 01 serves cells 01 and 02, a radio base station 02 serves cells 03 and 04, and a radio base station 03 serves cells 05 and 06.

Here, each radio base station serves multiple cells, and is capable of continuing communications of a mobile station by switching the radio link to another when the mobile station moves between the cells.

Note that, the radio controller apparatus performs mobile control processing between the cells by switching the radio link as described above, and performs radio link assignment control processing.

Here, referring to FIG. 2, a description will be given of a call setting procedure between the mobile station 01 and a radio controller apparatus 01, which is performed by a call from the mobile station 02 to the mobile station 01, in the mobile communication system shown in FIG. 1.

As shown in FIG. 2, in step S1401, a switching center 01 notifies, to the radio controller apparatus 01, a call setting instruction for the mobile station 01 located in the cell 01, by use of an "RAB Assignment Request message" on an RANAP (Radio Access Network Application Part) signal.

In step S1402, the radio controller apparatus 01 transmits, to the radio base station 01, a "Radio Link Setup Request message" on an NBAP (NodeB Application Part) signal.

In step S1403, the radio base station 01 performs a setting to transmit user data addressed to the mobile station 01 from the cell 01. In step S1404, the radio base station 01 transmits, to the radio controller apparatus 01, a "Radio Link Setup Response message" on the NBAP signal.

In step S1405, the radio controller apparatus 01 transmits a "Radio Bearer Setup message" on an RRC (Radio Resource Control) signal to the mobile station 01.

In step S1406, the mobile station 01 performs a setting to receive the user data transmitted from the cell 01. In step S1407, the mobile station 01 transmits, to the radio controller apparatus 01, a "Radio Bearer Setup Complete message" on the RRC signal.

In step S1408, the radio controller apparatus 01 determines whether or not the setting of radio access bearers with the mobile station 01 is normally completed. When determining that the setting of the radio access bearers with the mobile station 01 is normally completed, in step S1409, the radio controller apparatus 01 notifies, by use of an "RAB Assignment Response message" on an RANAP signal, the switching center 01 that the setting of the radio access bearers with the mobile station 01 is normally completed.

Likewise, the mobile station 02 also performs the call setting processing, and user data is forwarded in the order of the mobile station 01, the radio base station 01, the radio controller apparatus 01, the switching center 01, the radio controller apparatus 02, the radio base station 02 and the mobile station 02, or in the order reverse to this.

In addition, transmission and reception processing of signals between a switching center and a radio controller apparatus in the mobile communication system shown in FIG. 1 and specified in Non-Patent Document 1 is specified in Non-Patent Document 2.

Here, Non-Patent Document 2 specifies that an "SAI (Service Area Identity)" is exchanged as the location information of a mobile station between the switching center and the mobile station.

Thus, the switching center can perform charging control processing that allows call charges and communication charges to be variable for each service area (cell, for example) by determining the SAI and subscriber information (registration information) in combination, the subscriber information registered by the switching center.

As shown in FIGS. 3 through 6, Non-Patent Document 2 specifies four patterns of the charging control processing. Any of the patterns employs a configuration in which the radio controller apparatus 01 notifies the switching center 01 of the SAI by use of an RANAP signal.

In the example of FIG. 3, the radio controller apparatus 01 notifies the switching center 01 of the SAI in accordance with a request from the switching center 01. In examples shown in FIGS. 4 through 6, the radio controller apparatus 01 notifies the switching center 01 of the SAI without involving a request from the switching center 01.

In addition, Patent Document 1 discloses a technique in which the radio controller apparatus 01 in advance registers identification information (registration information) of a mobile station allowed to perform communications in units of cells controlled by the radio controller apparatus 01, and determines whether or not to allow communications with a specific mobile station located in a particular cell, with reference to the registration information retained in the radio controller apparatus 01, in accordance with a call setting instruction.

Non-Patent Document 1: 3GPP Technical Specification T521.101

Non-Patent Document 2: 3GPP Technical Specification TR25.413
Patent Document 1: Japanese Patent Application Publication 2005-109570

DISCLOSURE OF THE INVENTION

However, in the conventional mobile communication system disclosed in Non-Patent Document 2 and Patent Document 1, the switching center or the radio controller apparatus is configured to perform the charging control processing and call setting instruction reception processing in units of mobile stations. Thus, there arises a problem that the registration information registered in the switching center or the radio controller apparatus needs to be changed every time the number of mobile stations subscribed in the mobile communication system increases or decreases.

In this respect, the present invention has been made in view of the aforementioned problem. An object of the present invention is to provide a call admission control method and a radio controller apparatus that can achieve an improvement in maintainability and reduction in management costs in a mobile communication system in which whether or not to allow communications with a specific mobile station is determined for each cell.

A first aspect of the present invention is summarized as a call admission control method for a mobile station located in a particular cell, the method including the steps of: receiving, at a first radio controller apparatus, a call setting instruction for a first mobile station located in a first cell controlled by the first radio controller apparatus, from a core network; and setting an access link between the first radio controller apparatus and a first radio base station serving the first cell, and setting a first radio link between the first radio base station and the first mobile station in the first cell, when a group ID of the first mobile station included in the call setting instruction is determined to be managed by the first radio controller apparatus as a group ID of a mobile station allowed to perform communications in the first cell.

In the first aspect, the call admission control method can further include the steps of: requesting, from the first mobile station to the first radio controller apparatus, to set a second radio link between the first radio base station and the first mobile station in a second cell under the control of the first radio controller apparatus; and setting, at the first radio controller apparatus, the second radio link, when the group ID of the first mobile station is determined to be managed by the first radio controller apparatus as a group ID of a mobile station allowed to perform communications in the second cell.

In the first aspect, the call admission control method can further include the steps of: requesting, from the first mobile station to the first radio controller apparatus, to set a third radio link between a second radio base station and the mobile station in a third cell controlled by a second radio controller apparatus; notifying, from the first radio controller apparatus to the second radio controller apparatus, the group ID of the first mobile station; and setting, at the second radio controller apparatus, the third radio link, when the notified group ID of the first mobile station is determined to be managed by the second radio controller apparatus as a group ID of a mobile station allowed to perform communications in the third cell.

In the first aspect, when the group ID of the first mobile station is determined not to be managed by the first radio controller apparatus as a group ID of a mobile station allowed to perform communications in the third cell, the first radio controller apparatus can notify the determination result to the second radio controller apparatus.

In the first aspect, when the group ID of the first mobile station is determined to be managed by the first radio controller apparatus as a group ID of a mobile station not allowed to perform communications in the third cell, the first radio controller apparatus can discard the request to set the third radio link, the request being received from the first mobile station.

A second aspect of the present invention is summarized as a radio controller apparatus used in a call admission control method for a mobile station located in a particular cell, the radio controller apparatus including: a communication allowed group list manager section configured to manage, for each cell controlled by the radio controller apparatus, a group ID of a mobile station allowed to perform communications; a call setting instruction receiver section configured to receive, from a core network, a call setting instruction for a first mobile station located in a first cell controlled by the radio controller apparatus; and a link setting section configured to set an access link between the radio controller apparatus and a first radio base station serving the first cell, and to set a first radio link between the first radio base station and the first mobile station in the first cell, when the group ID of the first mobile station included in the call setting instruction is determined to be managed by the communication allowed group list manager section as a group ID of a mobile station allowed to perform communications in the first cell.

In the second aspect, when the first mobile station requests the radio controller apparatus to set a second radio link between the first radio base station and the first mobile station in a second cell controlled by the radio controller apparatus, and when the group ID of the first mobile station is determined to be managed by the communication allowed group list manager section as a group ID of a mobile station allowed to perform communications in the second cell, the link setting section can be configured to add the second radio link.

In the second aspect, the radio controller apparatus can further include: a communication not-allowed group list manager section configured to manage, for each cell controlled by a different radio controller apparatus, a group ID of a mobile station not allowed to perform communications; and a notification section configured to notify, to the different radio controller apparatus, the group ID of the first mobile station, when the first mobile station, requests the radio controller apparatus to set a third radio link between a third cell controlled by the different radio controller apparatus and the first mobile station.

In the second aspect, the communication not-allowed group list manager section can be configured to delete a group ID that has been managed for more than a predetermined period, from the group IDs of the mobiles stations not allowed to perform communications.

As described above, according to the present invention, it is possible to provide a call admission control method and a radio controller apparatus that can achieve an improvement in maintainability and reduction in management costs in a mobile communication system in which whether or not to allow communications with a specific mobile station is determined for each cell.

BRIEF DESCRIPTION OF THE DRAWINGS

FIG. 9 is a diagram showing an example of a communication allowed group ID list managed by an own-station cell-unit communication allowed group ID list manager section of the radio controller apparatus (call control radio controller apparatus) according to the first embodiment of the present invention.

FIG. 10 is a diagram showing an example of a communication not-allowed group ID list managed by a different-station cell-unit communication not-allowed group ID list manager section of the radio controller apparatus (call control radio controller apparatus) according to the first embodiment of the present invention.

FIG. 11 is a diagram showing an example of the communication not-allowed group ID list managed by the different-station cell-unit communication not-allowed group ID list manager section of the radio controller apparatus (call control radio controller apparatus) according to the first embodiment of the present invention.

FIG. 13 is a diagram showing an example of a communication allowed group ID list managed by an own-station cell-unit communication allowed group ID list manager section of the radio controller apparatus (presence-in-cell radio controller apparatus) according to the first embodiment of the present invention.

BEST MODE FOR CARRYING OUT THE INVENTION

Mobile Communication System According to First Embodiment of Present Invention

A description will be given of a configuration of a mobile communication system according to a first embodiment of the present invention with reference to FIGS. 7 through 13.

The mobile communication system according to the first embodiment is configured to perform call admission control for a mobile station located in a particular cell. Specifically, the mobile communication system according to the first embodiment is configured to perform not only the call admission control for a mobile station located in a particular cell at start of communications (at the time of receiving a call setting instruction), but also the call admission control for the mobile station at the time of mobile control after the start of communications.

Figure 1:
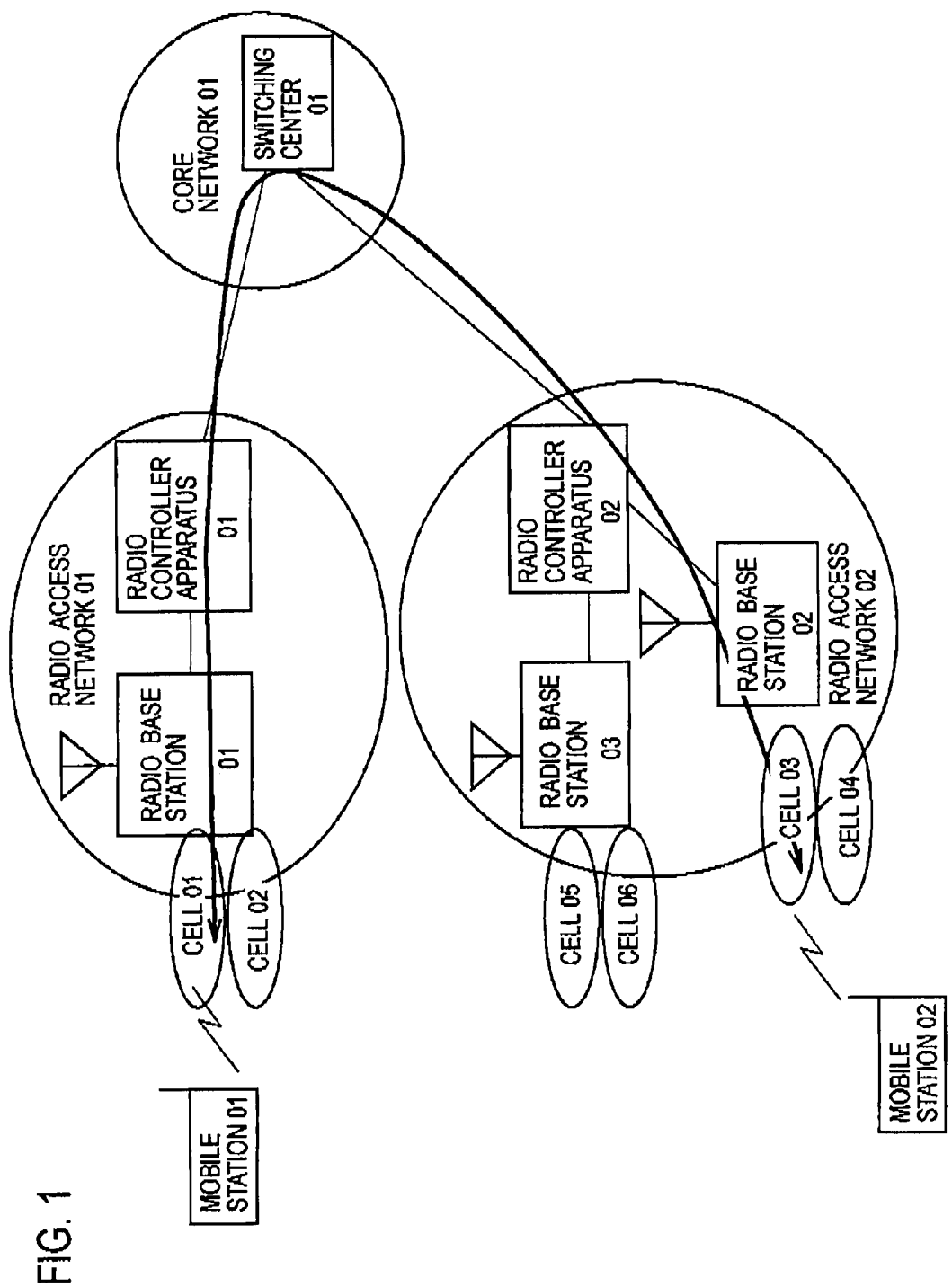
FIG. 1 is an overall configuration diagram of a general mobile communication system.
Figure 2:
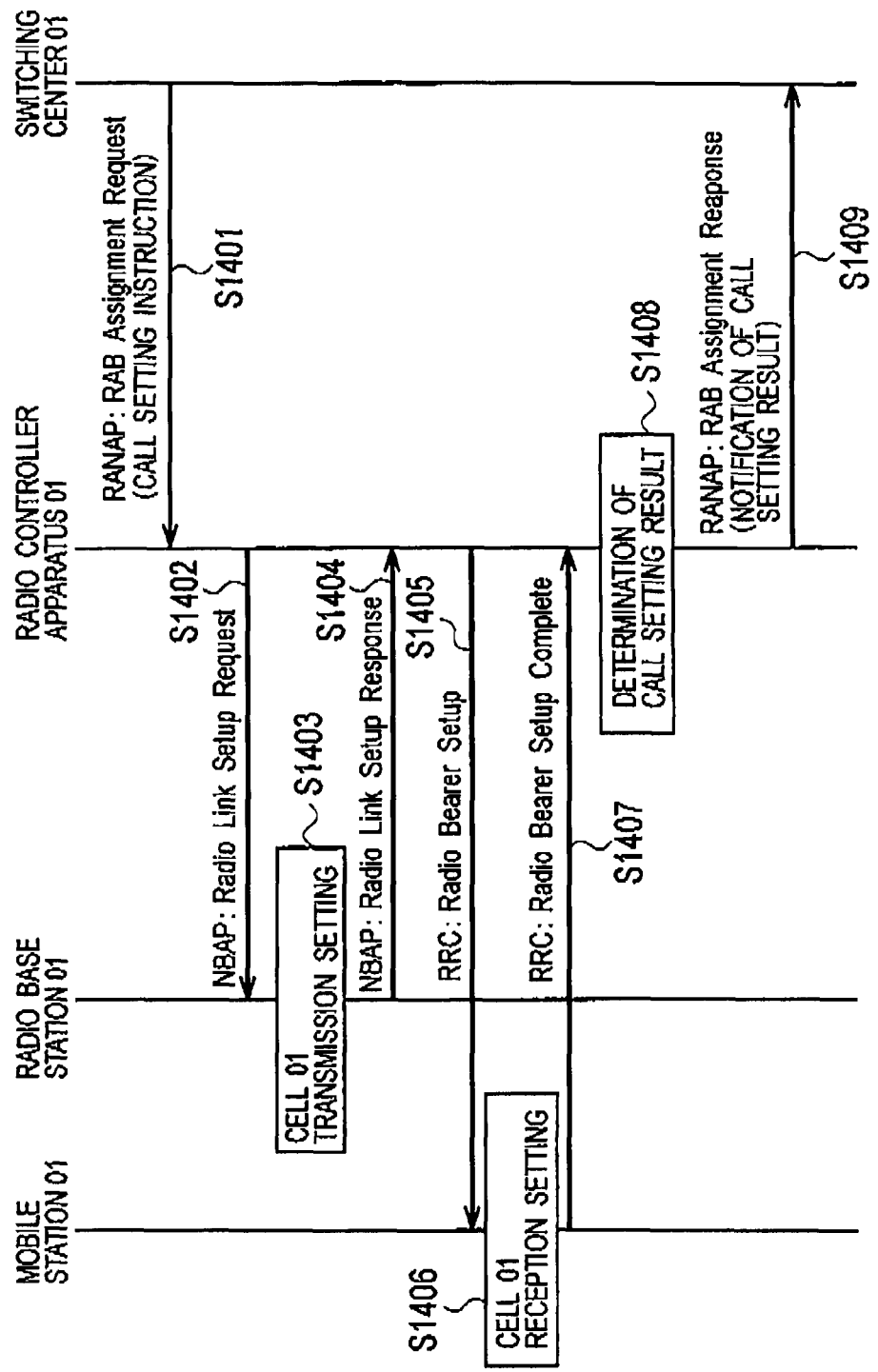
FIG. 2 is a sequence diagram showing a call setting procedure in a conventional mobile communication system.
Figure 3:
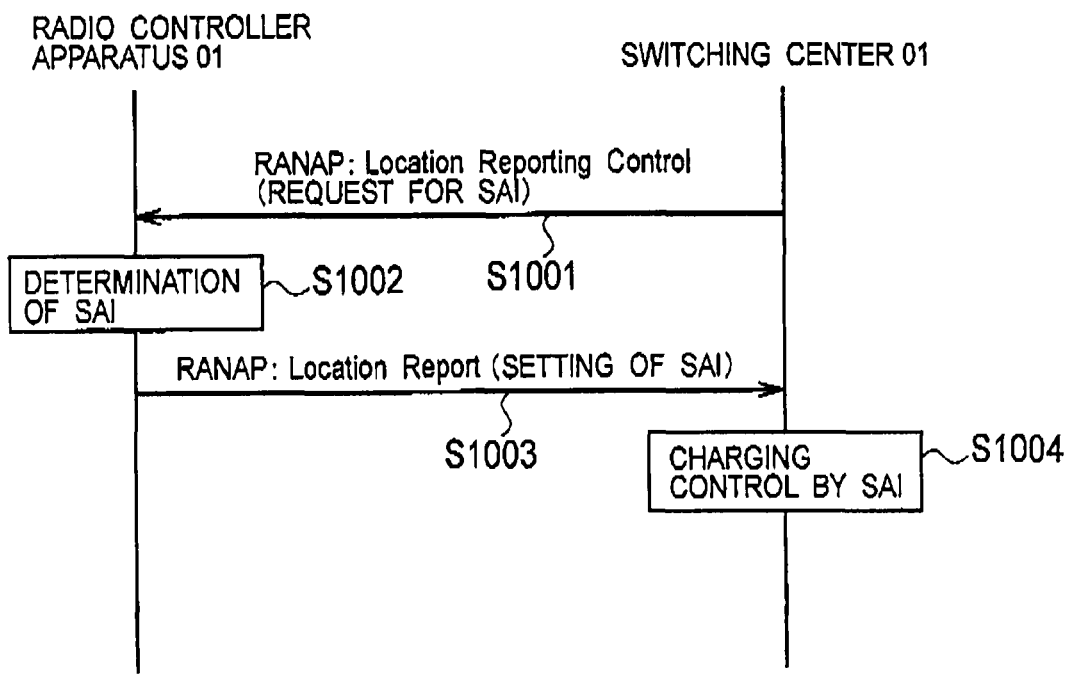
FIG. 3 is a sequence diagram showing a charging procedure in the conventional mobile communication system.
Figure 4:
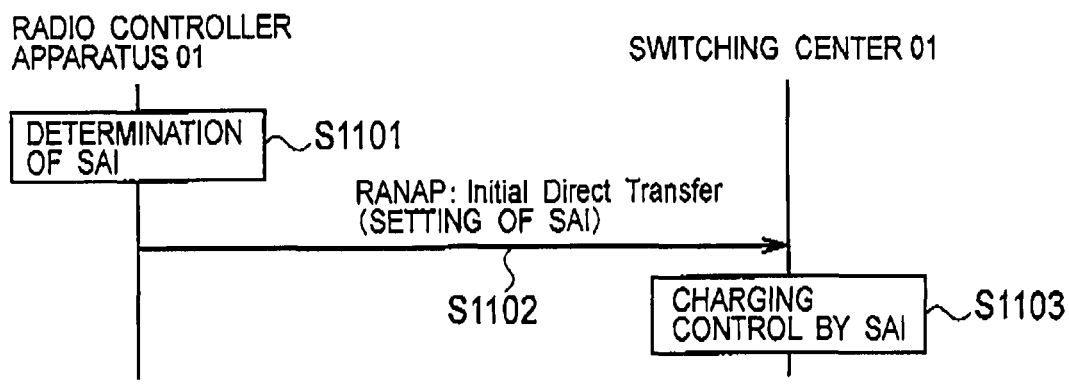
FIG. 4 is a sequence diagram showing a charging procedure in the conventional mobile communication system.
Figure 5:
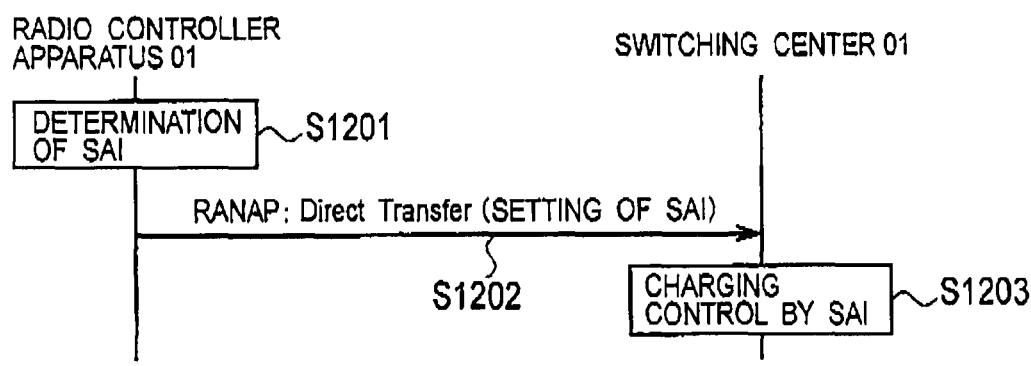
FIG. 5 is a sequence diagram showing a charging procedure in the conventional mobile communication system.
Figure 6:
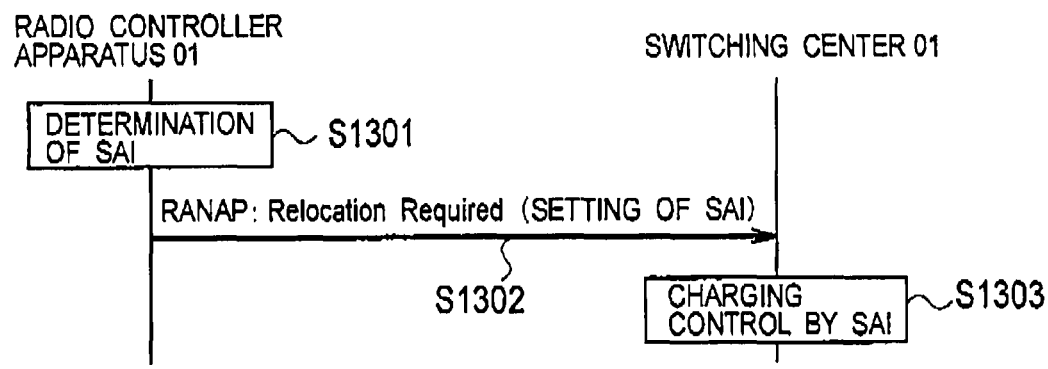
FIG. 6 is a sequence diagram showing a charging procedure in the conventional mobile communication system.
Figure 7:
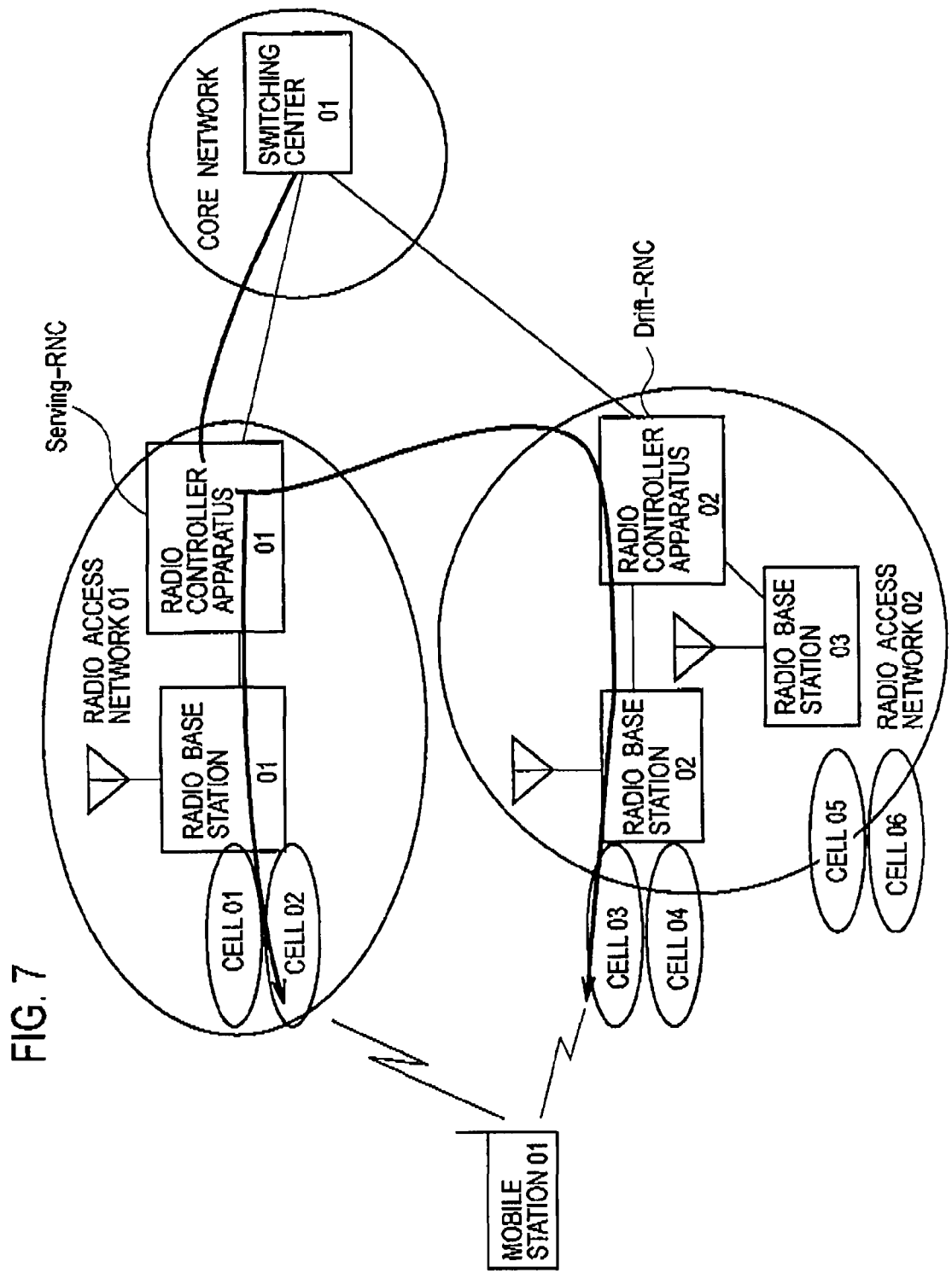
FIG. 7 is an overall configuration diagram of a mobile communication system according to a first embodiment of the present invention.

As shown in FIG. 7, the mobile communication system according to the first embodiment includes radio base stations 01 to 03, radio controller apparatuses 01 and 02, and a switching center 01, as in the case of the mobile communication system shown in FIG. 1.

Here, in the example of FIG. 7, the radio controller apparatus 01 (first radio controller apparatus) is a call control radio controller apparatus (Serving-RNC) that performs radio control for the mobile station 01, and the radio controller apparatus 02 (second radio controller apparatus) is not a call control radio controller apparatus, but a presence-in-cell radio controller apparatus (Drift-RNC) in which the mobile station 01 is located.

Note that, in the embodiment, a description will be given of an example of a case where functions of a radio controller apparatus are provided to an RNC that belongs to a radio access network, but the functions of the radio controller apparatus may be provided in a different apparatus that belongs to the radio access network or a core network. Further, the functions of the radio controller apparatus may be provided in an apparatus such as a radio base station in a system such as LTE (Long Term Evolution).

Figure 8:
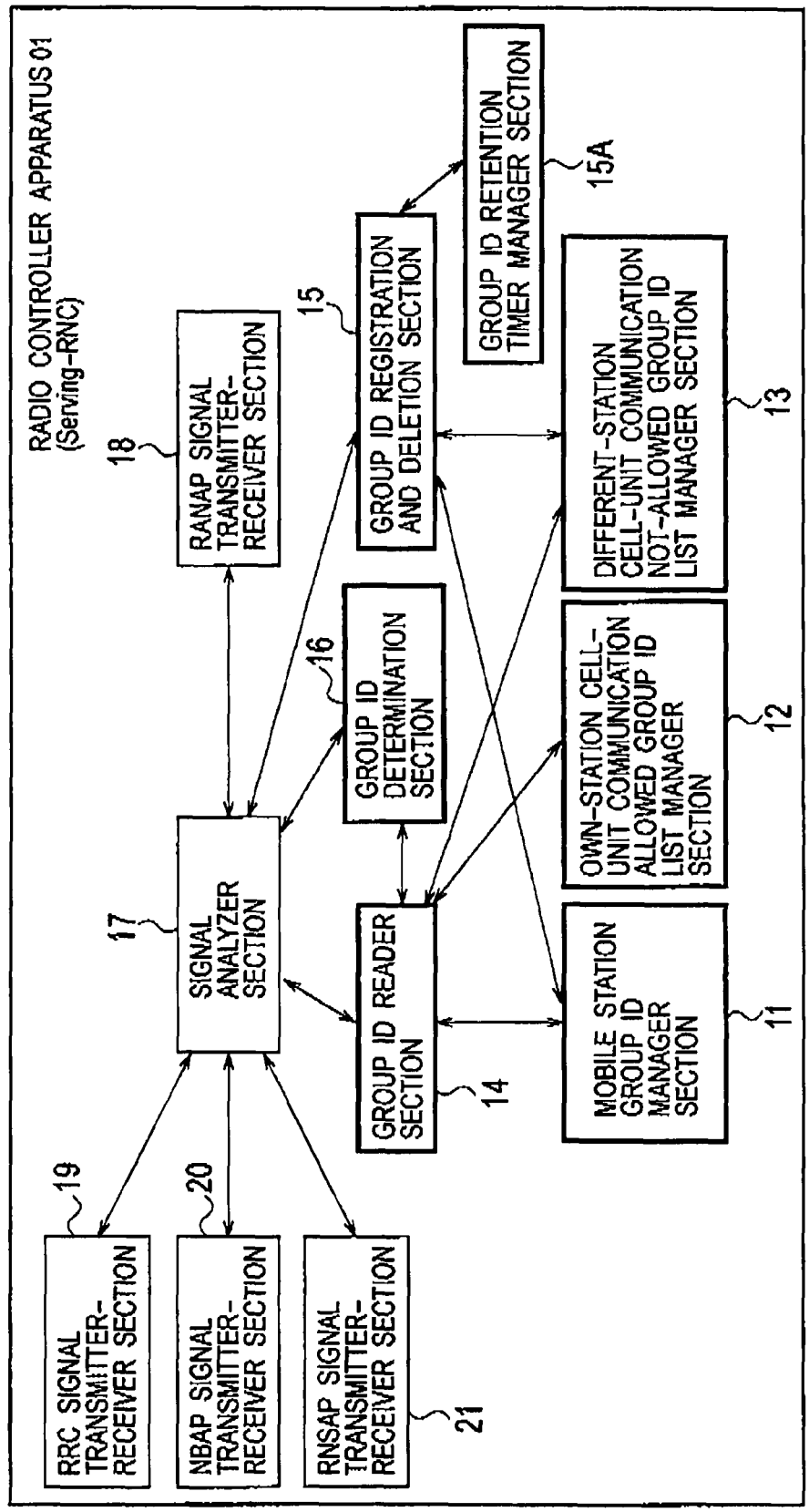
FIG. 8 is a functional block diagram of a radio controller apparatus (call control radio controller apparatus) according to the first embodiment of the present invention.

As shown in FIG. 8, the radio controller apparatus 01 (Serving-RNC) according to the present embodiment includes a mobile station group ID manager section 11, an own-station cell-unit communication allowed group ID list manager section 12, a different-station cell-unit communication not-allowed group ID list manager section 13, a group ID reader section 14, a group ID registration and deletion section 15, a group ID retention timer manager section 15A, a group ID determination section 16, a signal analyzer section 17, an RANAP signal transmitter-receiver section 18, an RRC signal transmitter-receiver section 19, an NBAP signal transmitter-receiver section 20 and an RNSAP signal transmitter-receiver section 21.

The signal analyzer section 17 is configured to analyze an RANAP signal received by the RANAP signal transmitter-receiver section 18, an RRC signal received by the RRC signal transmitter-receiver section 19, an NEAP signal received by the NBAP signal transmitter-receiver section 20 or an RNSAP (Radio Network Subsystem Application Part) signal received by the RNSAP signal transmitter-receiver section 21.

In addition, the signal analyzer section 17 is configured to notify, to the group ID reader 14 section, the group ID registration and deletion section 15, the group ID determination section 16, the RANAP signal transmitter-receiver section 18, the RRC signal transmitter-receiver section 19, the NEAP signal transmitter-receiver section 20 or the RNSAP signal transmitter-receiver section 21, the result of the analysis.

For example, when detecting an "RAB Assignment Request message (call setting instruction)" on an RANAP signal received by the RANAP signal transmitter-receiver section 18, the signal analyzer section 17 is configured to instruct the group ID registration and deletion section 15 to register a group ID of the mobile station 01 included in the call setting instruction to the mobile station group ID manager section 11.

The signal analyzer section 17 is configured to instruct the group ID determination section 16 to determine whether or not the group ID of the mobile station 01 included in the call setting instruction is managed by the own-station cell-unit communication allowed group ID list manager section 12 as a group ID (communication allowed group ID list of a cell 01) of a mobile station allowed to perform communications in the cell 01 (first cell) related to the call setting instruction.

Here, when notified by the group ID determination section 16 that the determination result is affirmative (YES), the signal analyzer section 17 is configured to instruct the RRC signal transmitter-receiver section 19 and the NBAP signal transmitter-receiver section 20 to set an access link between the radio base station 01 serving the cell 01 and the radio controller apparatus 01, and then to set a first radio link between the radio base station 01 and the mobile station 01 in the cell 01.

Moreover, when the mobile station 01 requests, by means of a "Measurement Report message" on an RRC signal, the radio controller apparatus 01 to set (add) a second radio link between the radio base station 01 and the mobile station 01 in a cell 02 (second cell) controlled by the radio controller apparatus 01, the signal analyzer section 17 is configured to instruct the group ID determination section 16 to determine whether or not the group ID of the mobile station 01 managed by the mobile station group ID manager section 11, is managed by the own-station cell-unit communication allowed group ID list manager section 12 as a group ID (communication allowed group ID list of the cell 02) of a mobile station allowed to perform communications in the cell 02.

Here, when notified by the group ID determination section 16 that the determination result is affirmative (YES), the signal analyzer section 17 is configured to instruct the RRC 01 (first cell) related to the call setting instruction.

Here, when notified by the group ID determination section 16 that the determination result is affirmative (YES), the signal analyzer section 17 is configured to instruct the RRC signal transmitter-receiver section 19 and the NBAP signal transmitter-receiver section 20 to set an access link between the radio base station 01 serving the cell 01 and the radio controller apparatus 01, and then to set a first radio link between the radio base station 01 and the mobile station 01 in the cell 01.

Moreover, when the mobile station 01 requests, by means of a "Measurement Report message" on an RRC signal, the radio controller apparatus 01 to set (add) a second radio link between the radio base station 01 and the mobile station 01 in a cell 02 (second cell) controlled by the radio controller apparatus 01, the signal analyzer section 17 is configured to instruct the group ID determination section 16 to determine whether or not the group ID of the mobile station 01 managed by the mobile station group ID manager section 11, is managed by the own-station cell-unit communication allowed group ID list manager section 12 as a group ID (communication allowed group ID list of the cell 02) of a mobile station allowed to perform communications in the cell 02.

Here, when notified by the group ID determination section 16 that the determination result is affirmative (YES), the signal analyzer section 17 is configured to instruct the RRC signal transmitter-receiver section 19 and the NBAP signal transmitter-receiver section 20 to set (add) the second radio link between the radio base station 01 and the mobile station 01 in the cell 02.

Further, when the mobile station 01 requests, by means of a "Measurement Report message" on an RRC signal, the radio controller apparatus 01 to set (add) a third radio link between the radio base station 02 and the mobile station 01 in the cell 03 (third cell) controlled by the second radio controller apparatus 02, the signal analyzer section 17 is configured to instruct the group ID determination section 16 to determine whether or not the group ID of the mobile station 01 managed by the mobile station group ID manager section 11 is managed by the different-station cell-unit communication not-allowed group ID list manager section 13 as a group ID (communication not-allowed group ID list of the cell 03) of a mobile station not allowed to perform communications in the cell 03.

Here, when notified by the group ID determination section 16 that the determination result is negative (NO), the signal analyzer section 17 is configured to instruct the RNSAP signal transmitter-receiver section 18 to notify the radio controller apparatus 02 (second radio controller apparatus) of the group ID of the mobile station 01.

Specifically, in this case, the radio controller apparatus 01 cannot determine whether or not the third radio link can be set, so that the radio controller apparatus 01 transmits a "Radio Link Setup Request message" including the group ID of the mobile station 01 on an RNSAP signal to the second radio controller apparatus 02, and thereby requests the second radio controller apparatus 02 to determine whether or not the group ID is managed as a group ID (communication allowed group ID list of the cell 03) of a mobile station allowed to perform communications in the cell 03.

In addition, when detecting an "Radio Link Setup Failure message (group ID determination NG)" on an RNSAP signal received by the RNSAP signal transmitter-receiver section 18, the signal analyzer section 17 is configured to instruct the group ID registration and deletion section 15 to register the group ID of the mobile station related to this message in the communication not-allowed group ID list in the cell related to the message in the different-station cell-unit communication not-allowed group ID list manager section 13.

The mobile station group ID manager section 11 is configured to manage the group ID of a mobile station included in the aforementioned call setting instruction.

The own-station cell-unit communication allowed group ID list manager section 12 is configured to manage, for each of the cells 01 and 02 controlled by the radio controller apparatus 01, a group ID (communication allowed group ID list) of a mobile station allowed to perform communications.

FIG. 9 shows examples of group IDs (communication allowed group ID list for each cell) for each of the cells, which are managed by the own-station cell-unit communication allowed group ID list manager section 12.

The different-station cell-unit communication not-allowed group ID list manager section 13 is configure to manage, for each cell (cells 3 to 6, for example) controlled by a different radio controller apparatus (radio controller apparatus 02, for example), a group ID (communication not-allowed group ID list) of the mobile station not allowed to perform communications.

FIGS. 10 and 11 show examples of group IDs (communication not-allowed group ID list for each cell) for each cell, which are managed by the different-station cell-unit communication not-allowed group ID list manager 13.

The group ID reader section 14 is configured to read a predetermined group ID (or a group ID list) from the mobile station group ID manager section 11, the own station cell-unit communication allowed group ID list manager section 12 or the different-station cell-unit communication not-allowed group ID list manager section 13, in accordance with an instruction from the signal analyzer section 17.

The group ID registration and deletion section 15 is configured to register a predetermined group ID (or a group ID list) to the mobile station group ID manager section 11 and the different-station cell-unit communication not-allowed group ID list manager section 13, in accordance with an instruction from the signal analyzer section 17.

Note that, the group ID registration and deletion section 15 is configured to delete a group ID (group ID for which a later described group ID retention timer has expired) which has been managed for more than a predetermined time from the aforementioned group IDs (communication not-allowed group ID list for each cell) of the mobile stations not allowed to perform communications in each cell, in the different-station cell-unit communication not-allowed group ID list manager section 13.

Specifically, the group ID registration and deletion section 15 is configured to delete a group ID, when the group ID retention timer for the group ID in the communication not-allowed group ID list managed by a group ID retention timer manager section 15A expires.

The group ID determination section 16 is configured to make the aforementioned determination with reference to the group ID (or the group ID list) read by the group ID reader section 14.

Figure 12:
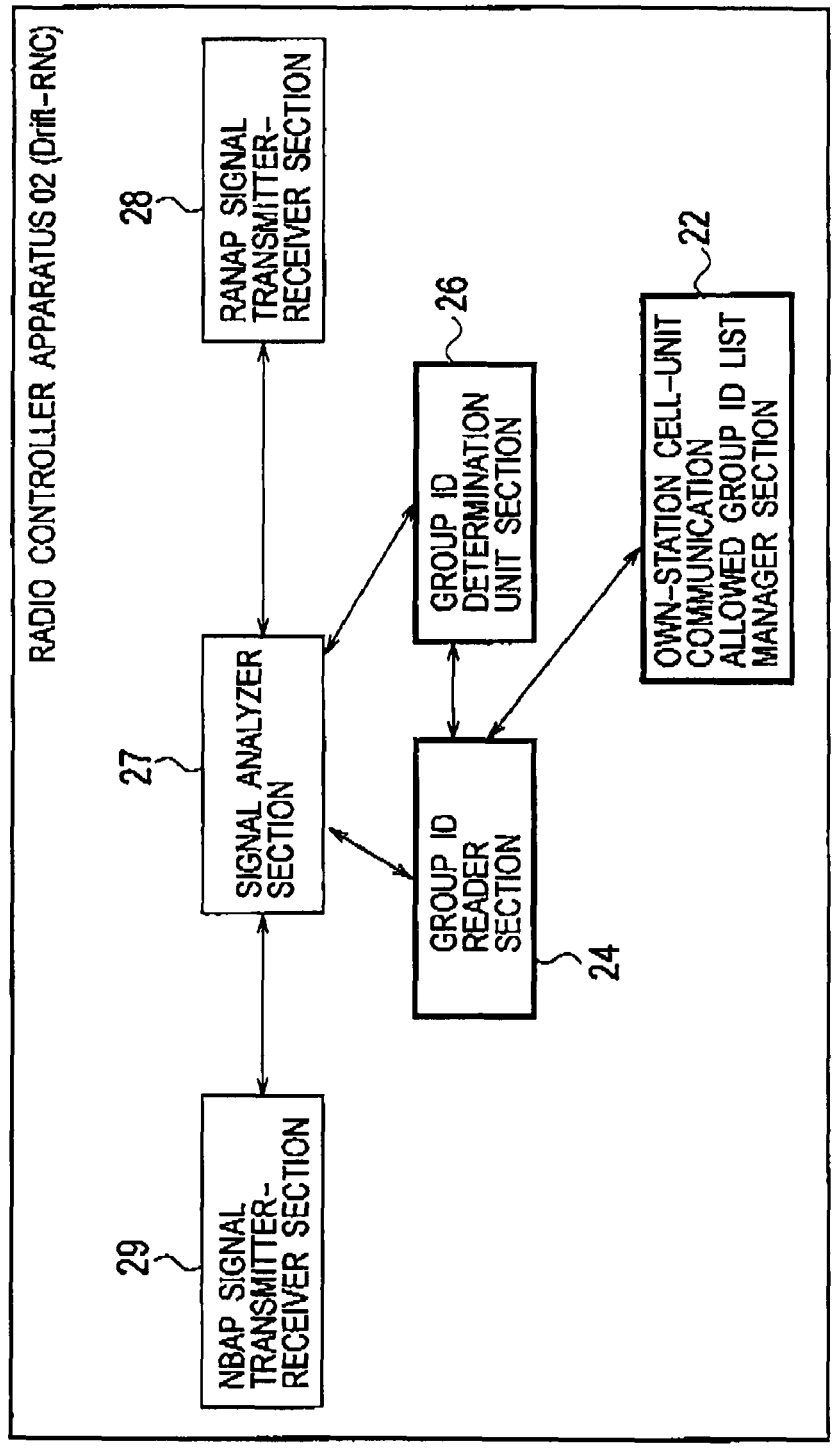
FIG. 12 is a functional block diagram of a radio controller apparatus (presence-in-cell radio controller apparatus) according to the first embodiment of the present invention.

As shown in FIG. 12, the radio controller apparatus 02 (Drift-RNC) according to the present embodiment includes an own-station cell-unit communication allowed group ID list manager section 22, a group ID reader section 24, a group ID determination section 26, a signal analyzer section 27, an RNSAP signal transmitter-receiver section 28 and an NBAP signal transmitter-receiver section 29.

The signal analyzer section 27 is configured to analyze an RNSAP signal received by the RNSAP signal transmitter-receiver section 28 or an NEAP signal received by the NEAP signal transmitter-receiver section 29.

In addition, the signal analyzer section 27 is configured to notify, to the group ID reader section 24, the group ID determination section 26, the NEAP signal transmitter-receiver section 29 or the RNSAP signal transmitter-receiver section 28, the result of the analysis.

For example, when detecting a "Radio Link Setup Request message (group ID)" on an RNSAP signal received by the RNSAP signal transmitter-receiver section 28, the signal analyzer section 27 is configured to instruct the group ID determination section 26 to determine whether or not the group ID of the mobile station 01 included in the message is managed by the own-station cell-unit communication allowed group ID list manager section 22 as a group ID (communication allowed group ID list of the cell 03) of a mobile station allowed to perform communications in the cell 03 (third cell) related to the message.

Here, when notified by the group ID determination section 26 that the determination result is affirmative (YES), the signal analyzer section 27 is configured to instruct the NEAP signal transmitter-receiver section 29 to set the third radio link between the radio base station 02 and the mobile station make the aforementioned determination with reference to the group ID (or group ID list) read by the group ID reader section 24.

(Operation of Mobile Communication System According to First Embodiment of Present Invention)

Hereinafter, a description will be given of an operation of the mobile communication system according to the present embodiment with reference to FIGS. 14 through 19.

Firstly, referring to FIG. 14, a description will be given of an operation of a case where an access link and a first radio link are set as radio access bearers between the radio controller apparatus 01 and the mobile station 01 in the mobile communication system of the present embodiment. The access link is set between the radio controller apparatus 01 and the radio base station 01 serving the cell 01. The first radio link is set between the radio base station 01 and the mobile station 01 in the cell 01.

Figure 14:
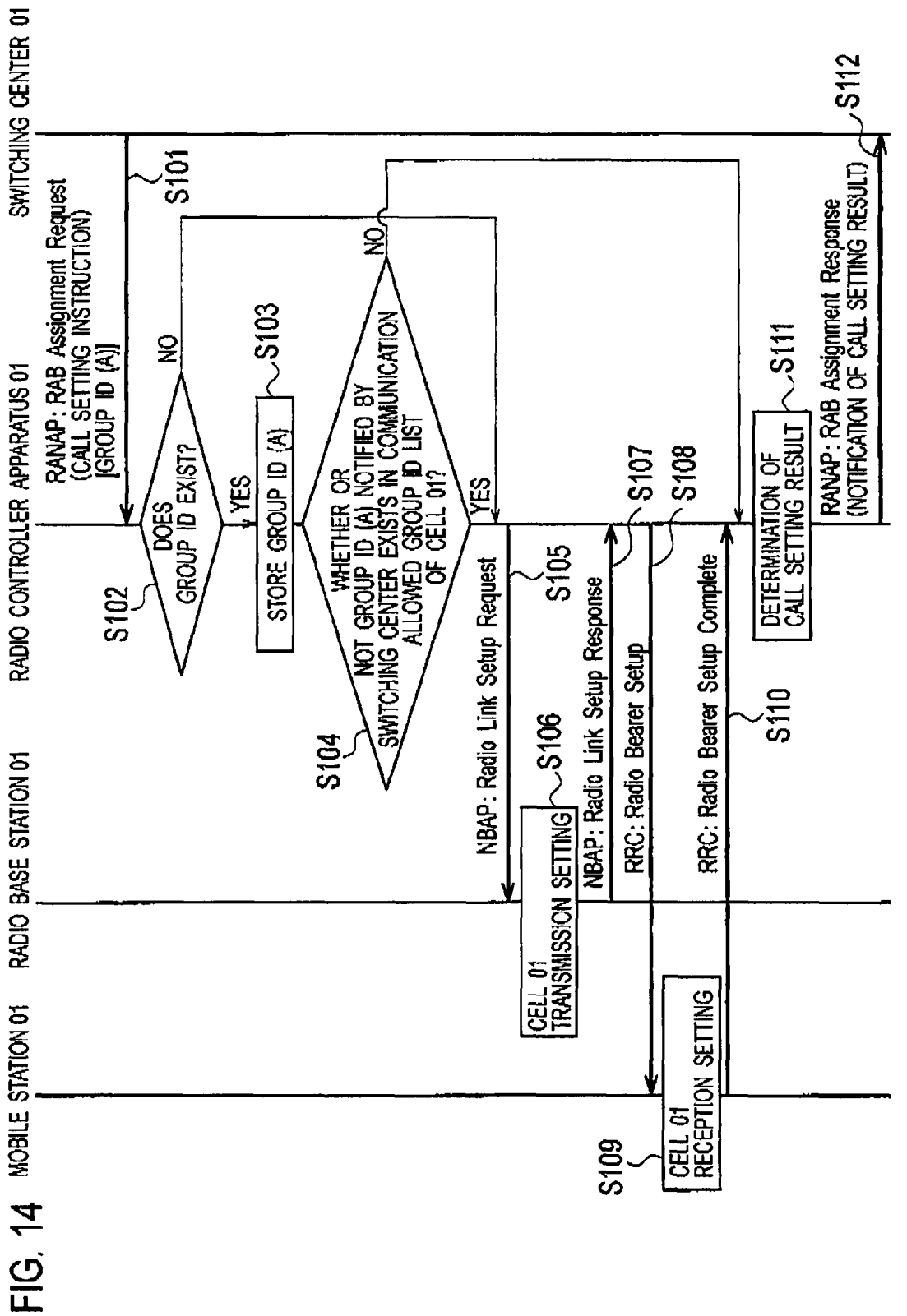
FIG. 14 is a sequence diagram showing a call setting procedure in the mobile communication system according to the first embodiment of the present invention.

As shown in FIG. 14, in step S101, the switching center 01, which belongs to the core network, transmits, to the radio controller apparatus 01, an "RAB Assignment Request message (call setting instruction)" addressed to the mobile station 01 located in the cell 01, on an RANAP signal. Here, the call setting instruction includes a group ID (A) of the mobile station 01.

In step S102, the signal analyzer section 17 of the radio controller apparatus 01 determines whether or not the group ID of the mobile station 01 is included in the call setting instruction. When the determination result is affirmative (YES), the operation proceeds to step S103. When the determination result is negative (NO), the operation proceeds to step S105.

In step S103, in accordance with an instruction from the signal analyzer section 17, the group ID registration and deletion section 15 of the radio controller apparatus 01 registers the group ID (A) of the mobile station 01, to the mobile station group ID manager section 11 in association therewith.

In step S104, in accordance with an instruction from the signal analyzer section 17, the group ID determination section 16 of the radio controller apparatus 01 determines whether or not the group ID (A) exists in the communication allowed group ID list of the cell 01, which is managed by the own-station cell-unit communication allowed group ID list manager section 12. When the determination result is affirmative (YES), the operation proceeds to step S105. When the determination result is negative (NO), the operation proceeds to step S111.

In step S105, in accordance with an instruction from the signal analyzer section 17, the NBAP signal transmitter-receiver section 20 of the radio controller apparatus 01 transmits, to the radio base station 01, a "Radio Link Setup Request message" on an NBAP signal.

In step S106, in accordance with the received "Radio Link Setup Request message," the radio base station 01 sets the first radio link for transmitting user data to the mobile station 01 via the cell 01. In addition, the radio base station 01 sets an access link between the radio base station 01 serving the cell 01 and the radio controller apparatus 01, and in step S107, transmits, to the radio controller apparatus 01, a "Radio Link Setup Response message" on an NBAP signal.

In step S108, the RRC signal transmitter-receiver section 19 of the radio controller apparatus 01 transmits to the mobile station 01, a "Radio Bearer Setup message" on an RRC signal, in accordance with an instruction from the signal analyzer section 17.

In step S109, in accordance with the received "Radio Bearer Setup message," the mobile station 01 sets the first radio link for receiving user data from the radio base station 01 via the cell 01, and sets radio access bearers with the radio controller apparatus 01. In addition, in step S110, the mobile station 01 transmits, to the radio controller apparatus 01, a "Radio Bearer Setup Complete message" on an RRC signal.

In step S111, the signal analyzer section 17 of the radio controller apparatus 01 determines whether or not the call setting processing (setting processing of the aforementioned access link, first radio link and radio access bearers) based on the aforementioned call setting instruction is completed. Then, in step S112, the RANAP signal transmitter-receiver section 18 of the radio controller apparatus 01 transmits, to the switching center 01, an "RAB Assignment Request message (call setting result notification)" on an RANAP signal, in accordance with an instruction from the signal analyzer section 17, and thereby, notifies the switching center 01 of the determination result (reception allowed or reception denied).

Figure 15:
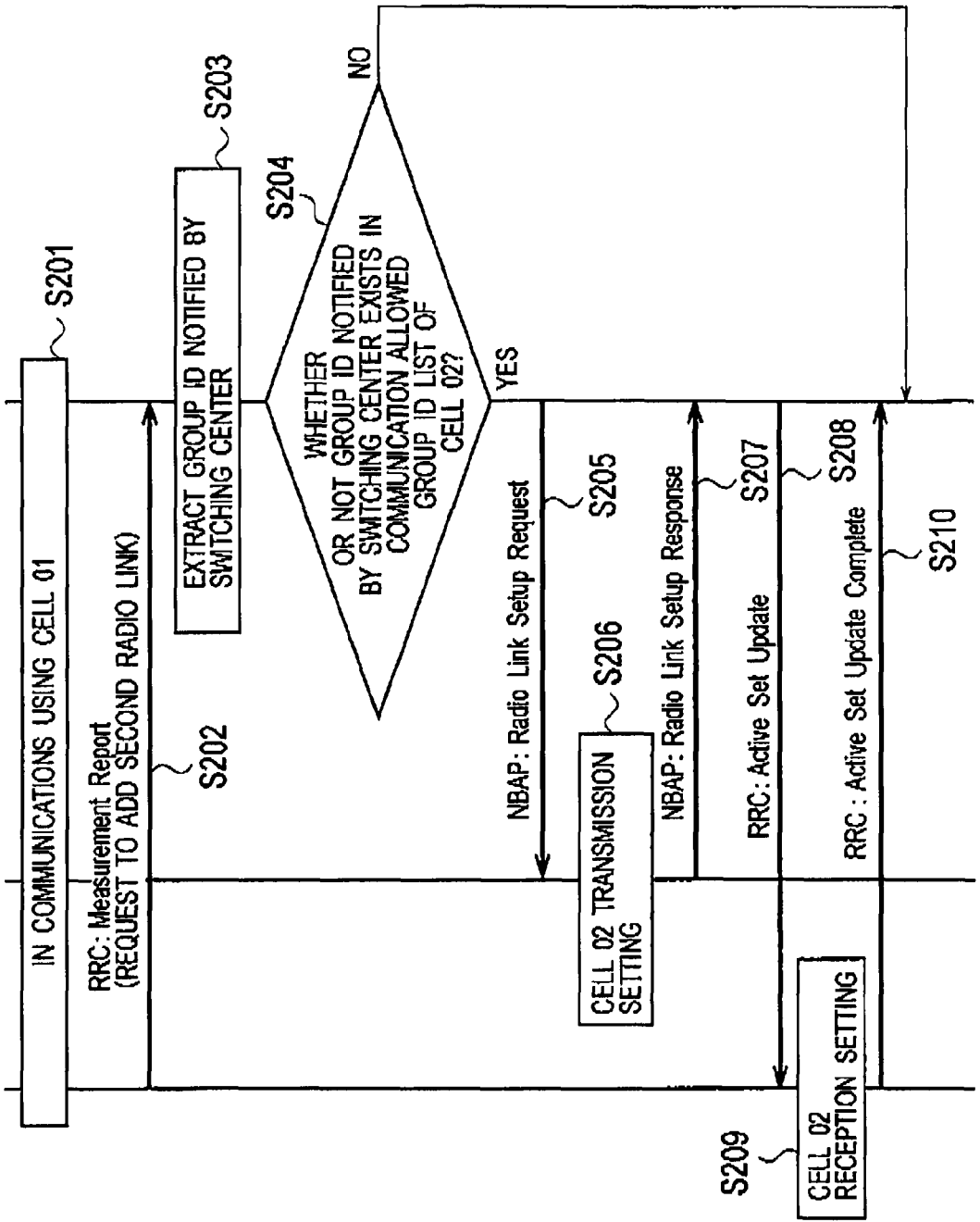
FIG. 15 is a sequence diagram showing a new cell adding procedure in the mobile communication system according to the first embodiment of the present invention.

Secondly, referring to FIG. 15, a description will be give of an operation of a case where the second radio link between the mobile station 01 and the radio base station 02 in the cell 02 is set (added) in the mobile communication system of the present embodiment.

As shown in FIG. 15, when the mobile station 01 and the radio controller apparatus 01 communicate with each other via the first radio link between the radio base station 01 and the mobile station 01 in the aforementioned cell 01 and via the access link between the radio controller apparatus 01 and the radio base station 01 serving the cell 01, in step S201, the mobile station 01 transmits, to the radio controller apparatus 01, a "Measurement Report message (request to add the second radio link with the radio base station 01 in the cell 02)" on an RRC signal, in step S202.

In step S203, in accordance with an instruction from the signal analyzer section 17, the group ID reader section 14 of the radio controller apparatus 01 extracts the group ID (A) of the mobile station 01, which is the transmission source of the received "Measurement Report message," from the mobile station group ID manager section 11.

In step S204, in accordance with an instruction from the signal analyzer section 17, the group ID determination section 16 of the radio controller apparatus 01 determines whether or not the group ID (A) exists in the communication allowed group ID list of the cell 02, which is managed by the own-station cell-unit communication allowed group ID list manager section 12. When the determination result is affirmative (YES), the operation proceeds to step S205. When the determination result is negative (NO), the operation ends.

In step S205, the NBAP signal transmitter-receiver section 20 of the radio controller apparatus 01 transmits, to the radio base station 01, a "Radio Link Setup Request message" on an NBAP signal, in accordance with an instruction from the signal analyzer to the radio base station 01 17.

In step S206, in accordance with the received "Radio Link Setup Request message," the radio base station 01 sets (adds) the second radio link for transmitting user data to the mobile station 01 via the cell 02. Then, the radio base station 01 transmits, to the radio controller apparatus 01, a "Radio Link Setup Response message" on an NBAP signal, in step S207.

In step S208, the RRC signal transmitter-receiver section 19 of the radio controller apparatus 01 transmits, to the mobile station 01, an "Active Set Update message" on an RRC signal, in accordance with an instruction from the signal analyzer section 17.

In step S209, in accordance with the received "Active Set Update message," the mobile station 01 sets the second radio link for receiving user data from the radio base station 01 via the cell 02. Then, in step S210, the mobile station 01 transmits, to the radio controller apparatus 01, an "Active Set Update Complete message" on an RRC signal.

Thirdly, referring to FIG. 16, a description will be given of an operation (part 1) of a case where the third radio link between the mobile station 01 and the radio base station 02 in the cell 03 is set (added) in the mobile communication system of the present embodiment.

Figure 16:
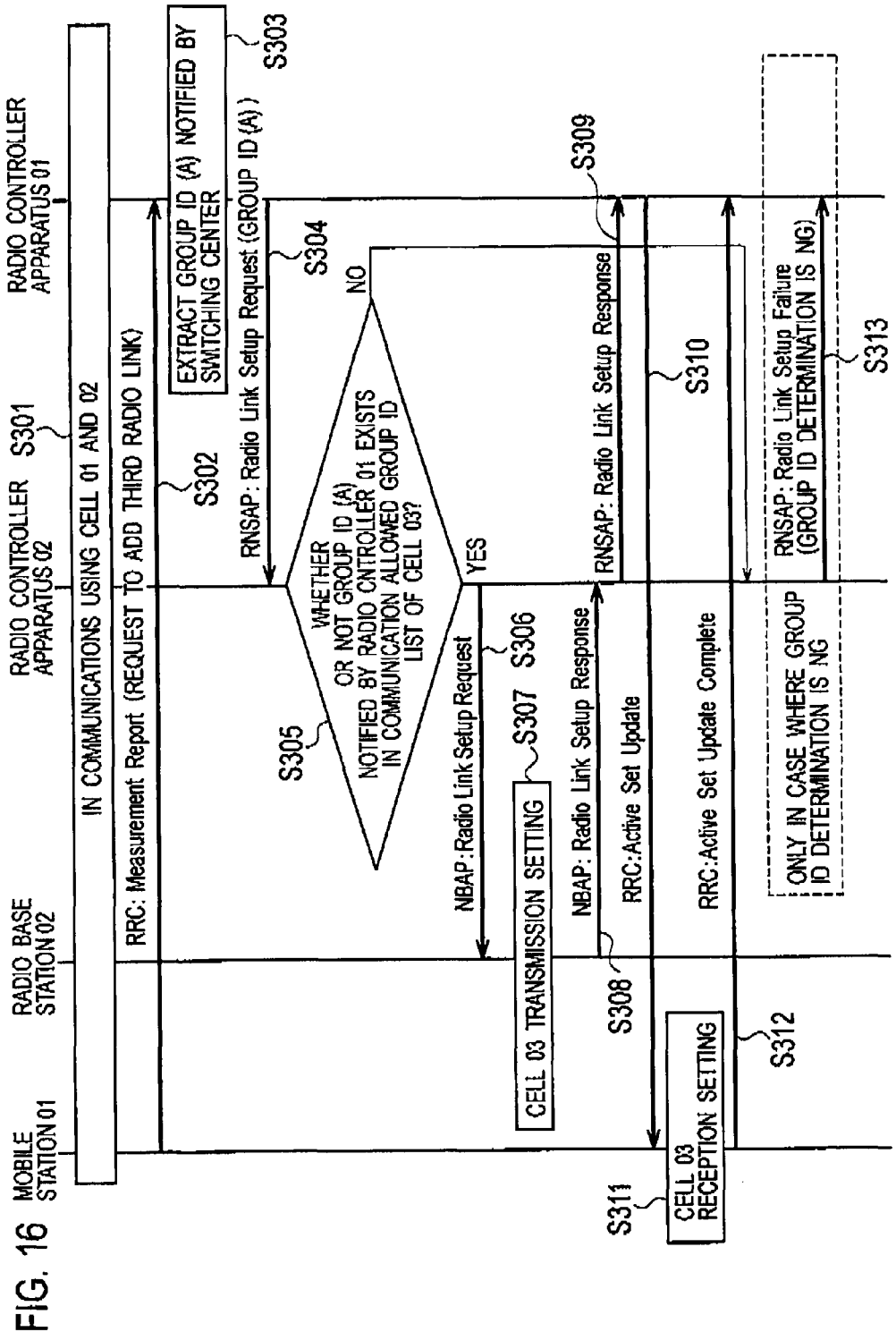
FIG. 16 is a sequence diagram showing a new cell adding procedure in the mobile communication system according to the first embodiment of the present invention.

As shown in FIG. 16, when the mobile station 01 and the radio controller apparatus 01 communicate with each other, via an access link between the aforementioned radio controller apparatus 01 and the radio base station 01 serving the cells 01 and 02, via the first radio link between the radio base station 01 and the mobile station 01 in the cell 01, and via the second radio link between the radio base station 01 and the mobile station 01 in the cell 02, in step S301, the mobile station 01 transmits, to the radio controller apparatus 01, a "Measurement Report message (request to add the third radio link with the radio base station 02 in the cell 03)" on an RRC signal, in step S302.

In step S303, in accordance with an instruction from the signal analyzer section 17, the group ID reader section 14 of the radio controller apparatus 01 extracts the group ID (A) of the mobile station 01, which is the transmission source of the received "Measurement Report message," from the mobile station group ID manager section 11.

In step S304, the RNSAP signal transmitter-receiver section 21 of the radio controller apparatus 01 transmits, to the radio controller apparatus 02, a "Radio Link Setup Request message" on an RNSAP signal, and thereby, notifies the radio controller apparatus 02 of the extracted group ID (A).

In step S305, in accordance with an instruction from the signal analyzer section 27, the group ID determination section 26 of the radio controller apparatus 02 determines whether or not the group ID (A) exists in the communication allowed group ID list of the cell 03, which is managed by the own-station cell-unit communication allowed group ID list manager section 22. When the determination result is affirmative (YES), the operation proceeds to step S306. When the determination result is negative (NO), the operation proceeds to step S313.

In step S306, the NBAP signal transmitter-receiver section 29 of the radio controller apparatus 02 transmits, to the radio base station 02, a "Radio Link Setup Request message" on an NBAP signal, in accordance with an instruction from the signal analyzer section 27.

In step S307, in accordance with the received "Radio Link Setup Request message," the radio base station 02 sets the third radio link for transmitting user data to the mobile station 01 via the cell 03. Then, the radio base station 02 transmits, to the radio controller apparatus 02, a "Radio Link Setup Response message" on an NBAP signal, in step S308.

In step S309, the RNSAP signal transmitter-receiver section 28 of the radio controller apparatus 02 transmits, to the radio controller apparatus 01, a "Radio Link Setup Response message" on an RNSAP signal.

In step S310, the RRC signal transmitter-receiver section 19 of the radio controller apparatus 01 transmits, to the mobile station 01, an "Active Set Update message" on an RRC signal, in accordance with an instruction from the signal analyzer section 17.

In step S311, in accordance with the received "Active Set Update message," the mobile station 01 sets the third radio link for receiving user data from the radio base station 02 via the cell 03. Then, in step S312, the mobile station 01 transmits, to the radio controller apparatus 01, an "Active Set Update Complete message" on an RRC signal.

Note that, in step S313, the RNSAP signal transmitter-receiver section 28 of the radio controller apparatus 02 transmits, to the radio controller apparatus 01, a "Radio Link Setup Failure message" on an RNSAP signal, and thereby, notifies the radio controller apparatus 01 that communications with the mobile station 01, which belongs to the group ID (A) in the cell 03, are not allowed.

Fourthly, referring to FIG. 17, a description will be given of an operation (part 2) of a case where the third radio link between the mobile station 01 and the radio base station 02 in the cell 03 is set (added) in the mobile communication system according to the present embodiment.

Figure 17:
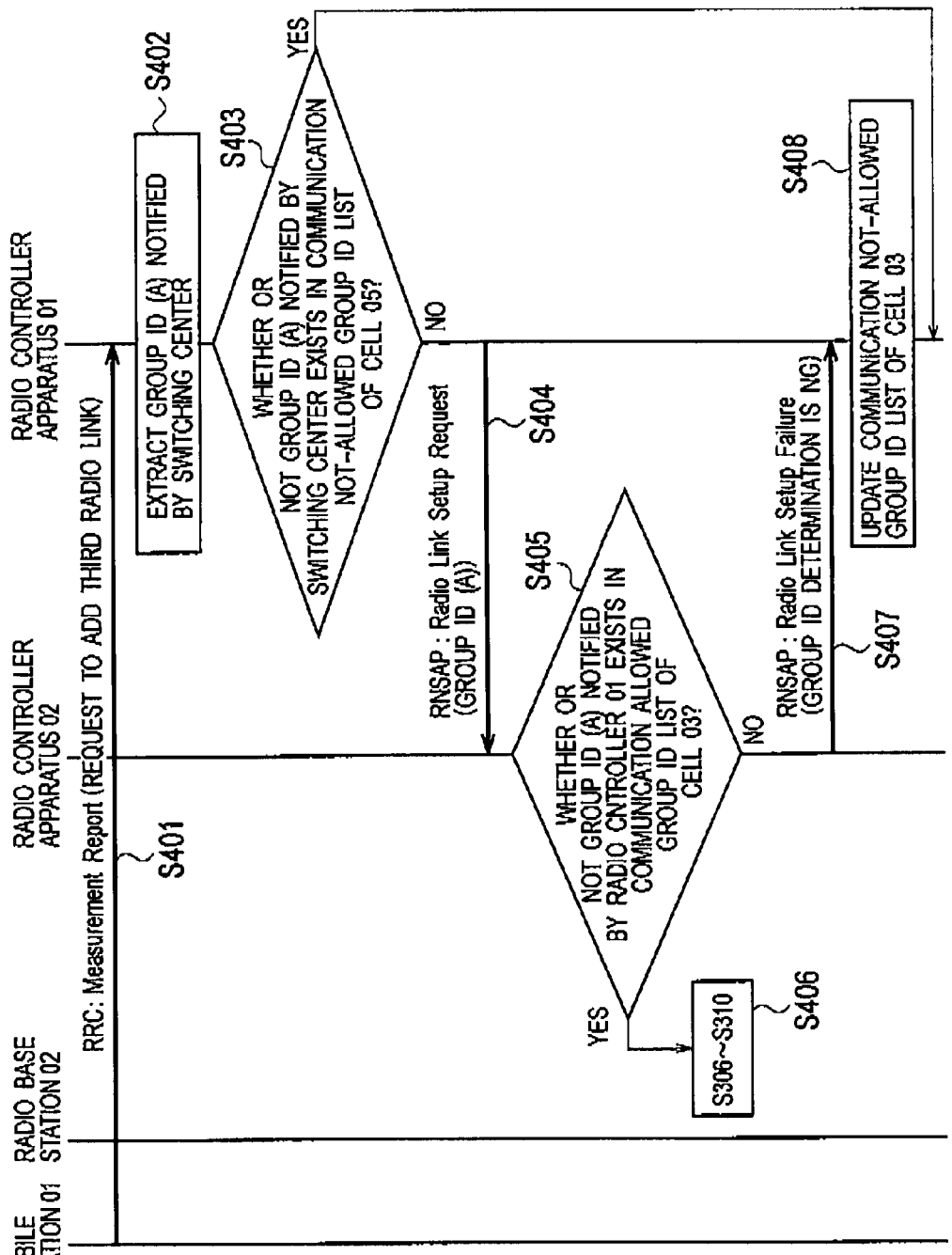
FIG. 17 is a sequence diagram showing a new cell adding procedure in the mobile communication system according to the first embodiment of the present invention.

As shown in FIG. 17, in step S401, when the mobile station 01 and the radio controller apparatus 01 communicate with each other, via the aforementioned access link between the radio controller apparatus 01 and the radio base station 01 serving the cell 02, and via the second radio link between the radio base station 01 and the mobile station 01 in the cell 02, the mobile station 01 transmits, to the radio controller apparatus 01, a "Measurement Report message (request to add the third radio link with the radio base station 02 in the cell 03)" on an RRC signal.

In step S402, in accordance with an instruction from the signal analyzer section 17, the group ID reader section 14 of the radio controller apparatus 01 extracts the group ID (A) of the mobile station 01, which is the transmission source of the received "Measurement Report message," from the mobile station group ID manager section 11.

In step S403, in accordance with an instruction from the signal analyzer section 17, the group ID determination section 16 of the radio controller apparatus 01 determines whether or not the group ID (A) exists in the communication not-allowed group ID list of the cell 03, which is managed by the different-station cell-unit communication not-allowed group ID list manager section 13. When the determination result is affirmative (YES), the operation ends. When the determination result is negative (NO), the operation proceeds to step S404.

In step S404, the RNSAP signal transmitter-receiver section 21 of the radio controller apparatus 01 transmits, to the radio controller apparatus 02, a "Radio Link Setup Request message" on an RNSAP signal, and thereby, notifies the radio controller apparatus 02 of the extracted group ID (A).

In step S405, in accordance with an instruction from the signal analyzer section 27, the group ID determination section 26 of the radio controller apparatus 02 determines whether or not the group ID (A) exists in the communication allowed group ID list of the cell 03, which is managed by the own-station cell-unit communication allowed group ID list manager section 22. When the determination result is affirmative (YES), the operation proceeds to step S406. When the determination result is negative (NO), the operation proceeds to step S407.

In step S406, the same processing as that performed in steps S306 through S310 shown in FIG. 16 is performed.

In step S407, the RNSAP signal transmitter-receiver section 28 of the radio controller apparatus 02 transmits, to the radio controller apparatus 01, a "Radio Link Setup Failure message" on an RNSAP signal, and thereby, notifies the radio controller apparatus 01 that the communications with the mobile station 01, which belongs to the group ID (A), are not allowed in the cell 03.

In step S408, in accordance with an instruction from the signal analyzer section 17, the group ID registration and deletion section 15 of the radio controller apparatus 01 adds the group ID (A) in the communication not-allowed group ID list of the cell 03, in the different-station cell-unit communication not-allowed group ID list manager section 13.

Fifthly, referring to FIGS. 18 and 19, a description will be given of an operation of a case where the third radio link is set (added) between the radio base station 03 and the mobile station 01 in the cell 05 controlled by the radio controller apparatus 02 in the mobile communication system according to the present embodiment. Here, the mobile station 01 is assumed to belong to a group of "group ID=C".

Figure 18:
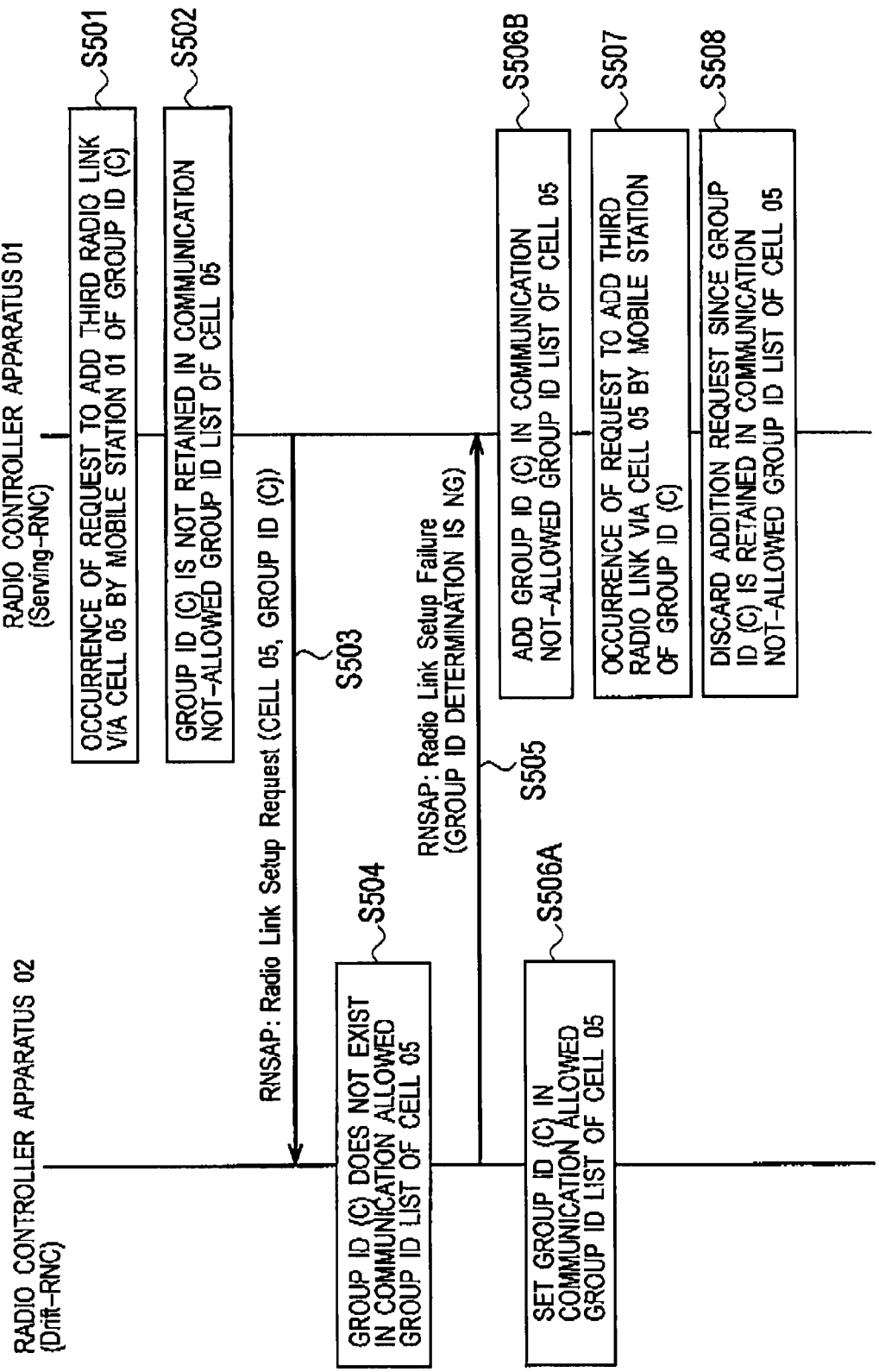
FIG. 18 is a sequence diagram showing a new cell adding procedure in the mobile communication system according to the first embodiment of the present invention.

As shown in FIG. 18, in step S501, the signal analyzer section 17 of the radio controller apparatus 01 detects a "request (Measurement Report message) to add the third radio link with the radio base station 03 in the cell 05" transmitted from the mobile station 01 of the group ID (C) on an RRC signal received by the RRC signal transmitter-receiver section 19.

Here, the different-station cell-unit communication not-allowed group ID list manager section 13 of the radio controller apparatus 01 is assumed to manage the communication not-allowed group ID list shown in FIG. 10.

In step S502, in accordance with an instruction from the signal analyzer section 17, the group ID determination section 16 of the radio controller apparatus 01 determines that the group ID (C) does not exist in the communication not-allowed group ID list of the cell 05, which is managed by the different-station cell-unit communication not-allowed group ID list manager section 13.

In step S503, the RNSAP signal transmitter-receiver section 21 of the radio controller apparatus 01 transmits, to the radio controller apparatus 02, a "Radio Link Setup Request message" on an RNSAP signal, and thereby, notifies the radio controller apparatus 02 of the extracted group ID (C) and the cell 05 related to the third radio link.

In step S504, in accordance with an instruction from the signal analyzer section 27, the group ID determination section 26 of the radio controller apparatus 01 determines that the group ID (C) does not exist in the communication allowed group ID list of the cell 05, which is managed by the own-station cell-unit communication allowed group ID list manager section 22.

Here, the own-station cell-unit communication allowed group ID list manager section 22 of the radio controller apparatus 02 is assumed to manage the communication not-allowed group ID list shown in FIG. 13.

In step S505, the RNSAP signal transmitter-receiver section 28 of the radio controller apparatus 02 transmits, to the radio controller apparatus 01, a "Radio Link Setup Failure message" on an RNSAP signal, and thereby, notifies the radio controller apparatus 01 that the communications with a mobile station group (including the mobile station 01) which belongs to the group ID (C) in the cell 05 are not allowed in the cell 05.

In step S506B, in accordance with an instruction from the signal analyzer section 17, the group ID registration and deletion section 15 of the radio controller apparatus 01 adds the group ID (C) in the communication not-allowed group ID list of the cell 05, in the different-station cell-unit communication not-allowed group ID list manager section 13. As a result, the communication not-allowed group ID list shown in FIG. 11 is thus managed in the different-station cell-unit communication not-allowed group ID list manager section 13 of the radio controller apparatus 01.

Thereafter, in step S507, the signal analyzer section 17 of the radio controller apparatus 01 detects a "request (Measurement Report message) to add the third radio link with the radio base station 03 in the cell 05" transmitted from a mobile station (can be the mobile station 01 or a mobile station other than the mobile station 01) included in the mobile station group of the group ID (C) on an RRC signal received by the RRC signal transmitter-receiver section 19.

In step S508, in accordance with an instruction from the signal analyzer section 17, the group ID determination section 16 of the radio controller apparatus 01 determines that the group ID (C) exists in the communication not-allowed group ID list of the cell 05, which is managed by the different-station cell-unit communication not-allowed group ID list manager section 13.

As described above, the communication not-allowed group ID list updated in step S506B is not only referred for the mobile station 01, but also for the other mobile stations.

As a result, the signal analyzer section 17 of the radio controller apparatus 01 discards the request to add the third radio link with the radio base station 03 in the cell 05, without transmission of a "Radio Link Setup Request message" on an RNSAP signal to the radio controller apparatus 02 from the RNSAP signal transmitter-receiver section 21 of the radio controller apparatus 01.

However, when the communication not-allowed group ID list shown in FIG. 11 is managed in the different-station cell-unit communication not-allowed group ID list manager section 13 of the radio controller apparatus 01, even if the group ID (C) is registered to the communication allowed group ID list of the cell 05 in step S506A, which is managed by the own-station cell-unit communication allowed group ID list manager section 22 of the radio controller apparatus 02, the RNSAP signal transmitter-receiver section 21 of the radio controller apparatus 01 cannot transmit, to the radio controller apparatus 02, a "Radio Link Setup Request message" on an RNSAP signal. Accordingly, there arises a problem that the radio controller apparatus 01 cannot establish the third radio link with a mobile station included in the mobile station group of the group ID (C), which exists in the cell 05.

Figure 19:
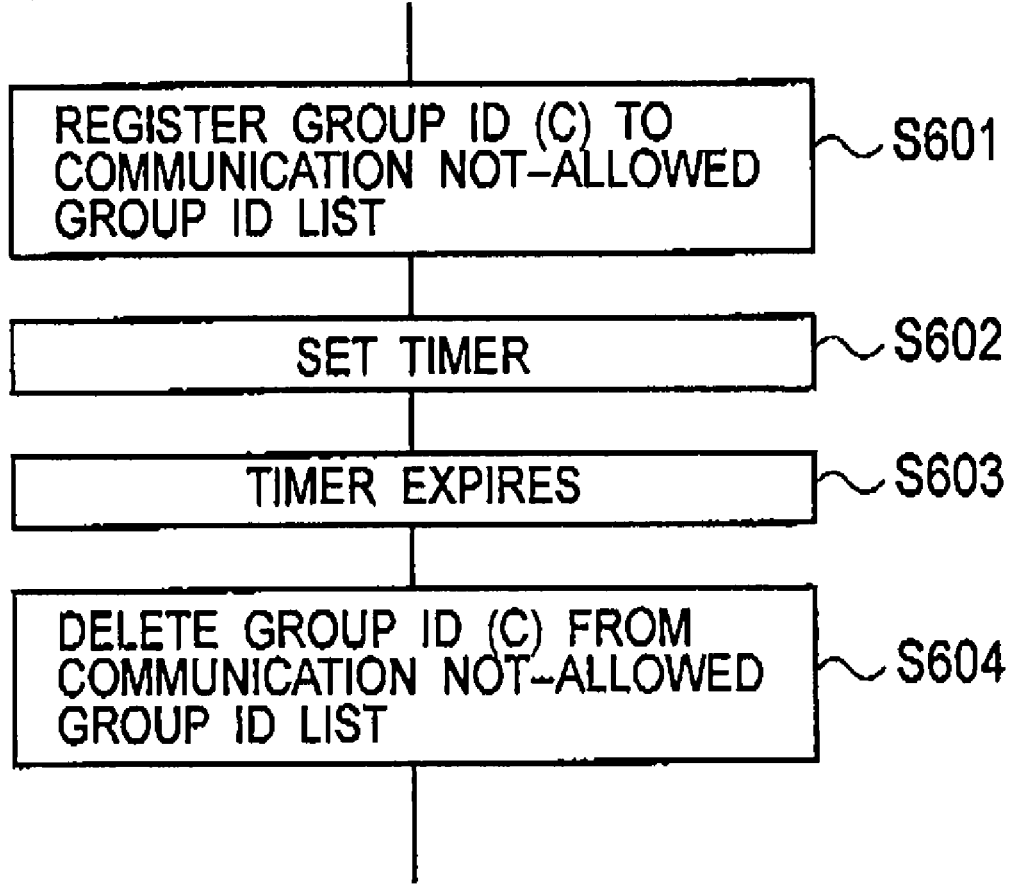
FIG. 19 is a sequence diagram showing a communication not-allowed group ID list updating procedure in the mobile communication system according to the first embodiment of the present invention.

In this respect, as shown in FIG. 19, the radio controller apparatus 01 is configured to update the communication not-allowed group ID list in a constant period, which is managed by the different-station cell-unit communication not-allowed group ID list manager section 13.

Specifically, as shown in FIG. 19, in step S601, the group ID registration and deletion section 15 of the radio controller apparatus 01 registers the group ID (C) to the communication not-allowed group ID list of the cell 05 in the different-station cell-unit communication not-allowed group ID list manager section 13.

In step S602, the group ID registration and deletion section 15 of the radio controller apparatus 01 starts the group ID retention timer (for the registered group ID (C)) managed by the group ID retention timer manager section 15A.

When detecting expiration of the group ID retention timer (for the registered group ID (C)) in step S602, the group ID registration and deletion section 15 of the radio controller apparatus 01 deletes the group (C) from the communication not-allowed group ID list of the cell 05 in the different-station cell-unit communication not-allowed group ID list manager section 13, in step S604.

(Effects and Advantages of Mobile Communication System According to First Embodiment of Present Invention)

With the mobile communication system according to the first embodiment of the present invention, an improvement in maintainability and reduction in management costs can be achieved in a mobile communication system in which whether or not to allow communications with a specific mobile station is determined for each cell.

For example, the following effect can be brought about according to the mobile communication system of the present embodiment. Consider a situation where the radio base station 01 is sold to a certain corporation. In this case, the group ID (A) is assigned to the corporation, and information is registered to the radio controller apparatus 01, the information indicating that communications with mobile stations assigned the group ID (A) are allowed in the cell 01 formed by the radio controller apparatus 01. Thereby, the registration information in the radio controller apparatus 01 does not have to be rewritten even when the number of mobile stations (group ID (A)) held by the corporation increases or decreases.

The present invention has been described above by using the aforementioned embodiments. However, it is obvious to those skilled in the art that the present invention is not limited to the embodiment described in this description. The present invention can be implemented as a revised and modified form without departing from the spirit and scope of the present invention, which are defined by the appended claims. Thus, the contents of this description aim to describe the exemplification and not to impose any limitation on the present invention.

Note that, the entire contents of Japanese Patent Application No. 2007-169323 (filed on Jun. 27, 2007) are incorporated in this description by reference.

INDUSTRIAL APPLICABILITY

As described above, the call admission control method and the radio controller apparatus according to the present invention are advantageous because they can achieve an improvement in maintainability and reduction in management costs in a mobile communication system in which whether or not to allow communications with a specific mobile station is determined for each cell.

The invention claimed is:

1. A call admission control method for a mobile station located in a particular cell, the method comprising the steps of:
   receiving, at a first radio controller apparatus, a call setting instruction for a first mobile station located in a first cell controlled by the first radio controller apparatus, from a core network; and
   setting an access link between the first radio controller apparatus and a first radio base station serving the first cell, and setting a first radio link between the first radio base station and the first mobile station in the first cell, when a group ID of the first mobile station included in the call setting instruction is determined to be managed by the first radio controller apparatus as a group ID of a mobile station allowed to perform communications in the first cell.

2. The call admission control method according to claim 1, further comprising the steps of:
   requesting, from the first mobile station to the first radio controller apparatus, to set a second radio link between the first radio base station and the first mobile station in a second cell under the control of the first radio controller apparatus; and
   setting, at the first radio controller apparatus, the second radio link, when the group ID of the first mobile station is determined to be managed by the first radio controller apparatus as a group ID of a mobile station allowed to perform communications in the second cell.

3. The call admission control method according to claim 1, further comprising the steps of:
   requesting, from the first mobile station to the first radio controller apparatus, to set a third radio link between a second radio base station and the mobile station in a third cell controlled by a second radio controller apparatus;
   notifying, from the first radio controller apparatus to the second radio controller apparatus, the group ID of the first mobile station; and
   setting, at the second radio controller apparatus, the third radio link, when the notified group ID of the first mobile station is determined to be managed by the second radio controller apparatus as a group ID of a mobile station allowed to perform communications in the third cell.

4. The call admission control method according to claim 3, wherein
   when the group ID of the first mobile station is determined not to be managed by the first radio controller apparatus as a group ID of a mobile station allowed to perform communications in the third cell, the first radio controller apparatus notifies the determination result to the second radio controller apparatus.

5. The call admission control method according to claim 3, wherein when the group ID of the first mobile station is determined to be managed by the first radio controller apparatus as a group ID of a mobile station not allowed to perform communications in the third cell, the first radio controller apparatus discards the request to set the third radio link, the request being received from the first mobile station.

6. A radio controller apparatus used in a call admission control method for a mobile station located in a particular cell, the radio controller apparatus comprising:

a communication allowed group list manager section configured to manage, for each cell controlled by the radio controller apparatus, a group ID of a mobile station allowed to perform communications;

a call setting instruction receiver section configured to receive, from a core network, a call setting instruction for a first mobile station located in a first cell controlled by the radio controller apparatus; and a link setting section configured to set an access link between the radio controller apparatus and a first radio base station serving the first cell, and to set a first radio link between the first radio base station and the first mobile station in the first cell, when the group ID of the first mobile station included in the call setting instruction is determined to be managed by the communication allowed group list manager section as a group ID of a mobile station allowed to perform communications in the first cell.

7. The radio controller apparatus according to claim 6, wherein when the first mobile station requests the radio controller apparatus to set a second radio link between the first radio base station and the first mobile station in a second cell controlled by the radio controller apparatus, and when the group ID of the first mobile station is determined to be managed by the communication allowed group list manager section as a group ID of a mobile station allowed to perform communications in the second cell, the link setting section is configured to add the second radio link.

8. The radio controller apparatus according to claim 6, further comprising:

a communication not-allowed group list manager section configured to manage, for each cell controlled by a different radio controller apparatus, a group ID of a mobile station not allowed to perform communications; and a notification section configured to notify, to the different radio controller apparatus, the group ID of the first mobile station, when the first mobile station requests the radio controller apparatus to set a third radio link between a third cell controlled by the different radio controller apparatus and the first mobile station.

9. The radio controller apparatus according to claim 8, wherein the communication not-allowed group list manager section is configured to delete a group ID that has been managed for more than a predetermined period, from the group IDs of the mobiles stations not allowed to perform communications.

* * * * *